July 2, 1935.  R. L. BANGS ET AL  2,006,706

INSULATED COVER

Filed July 9, 1932

INVENTOR
Ralph L. Bangs
BY William A. Hermanson
ATTORNEY

Patented July 2, 1935

2,006,706

UNITED STATES PATENT OFFICE 2,006,706

INSULATED COVER

Ralph L. Bangs, Wakefield, and William A. Hermanson, Brighton, Mass., assignors to Forest Wadding Company, Boston, Mass.

Application July 9, 1932, Serial No. 621,570

5 Claims. (Cl. 62—91.5)

The present invention relates to insulated covers, and more particularly to covers of such nature as to preserve food stuffs in certain existing temperature conditions.

The present invention among other things aims to preserve food in a cold state by the application of freezing mixtures or compounds without providing an excess of cold to the food stuff by which its normal temperature would otherwise be substantially changed.

Solid carbon dioxide which is familiarly known as dry ice or solid $CO_2$ is now in common use for keeping foods such as ice cream, cold. In packing and shipping ice cream it has now become a common practice to use solid $CO_2$ to keep the ice cream cold. The amount of solid $CO_2$ which is used in packing, depends upon the length of time that ice cream is to be kept cold. If the ice cream happens to be used before it is intended to be used the cream is usually so cold that it must be allowed to stand for some time before it is soft enough to be eaten. Often times it happens that ice cream is served in a very hard frozen state due to the fact that the solid $CO_2$ has kept the ice cream too cold.

This condition particularly arises with solid $CO_2$ because its temperature is minus 110° F. and this is far too low a temperature for ice cream which begins to freeze below 32° F.

The present invention has for one of its purposes the preservation of food stuff by the use of solid $CO_2$ in a state such that it can be immediately used after being unpacked, even though the ice cream or food stuff has to be preserved cold for a range of 10 to 48 hours. With the present invention the food stuff might be used after one or two hours and found to be in its natural cold state. With most creams and the like, it is quite as important also not to make them too cold as not to let them get too warm. Freezing in particular changes the homogeneity and crystallization of the constituents of the ice cream and distinctly changes its flavour and destroys the richness of taste.

In a modified form of the present invention the general principle may be applied to keeping milk in bottles, or the like in its natural state, as for instance, in cold winter days when the temperature is lower than freezing. In this case a hood is provided which tends to keep the heat of the milk in the bottle and the cold outside.

The present invention will be more clearly understood from a consideration of the description given below in connection with the drawing, in which.

Figure 1:
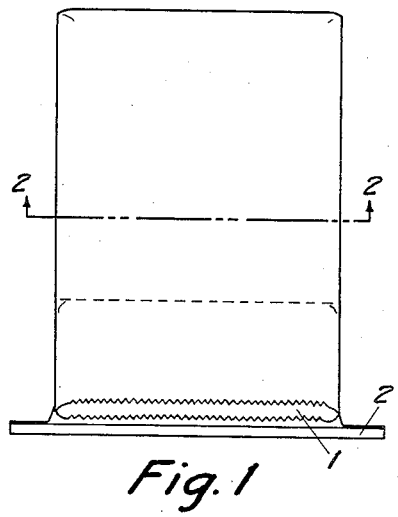
Figure 1 shows a conditioning pouch.

In Figure 1, the ice cream conditioning pouch is illustrated. This is adapted to be placed in the top of a box preferably insulated in which the ice cream has already been placed. The pouch is preferably made of a kraft paper or the like and open only at the end 1. The pouch at one side of the open end may be provided with a flexible stay 2 for closing the open end of the pouch after the solid $CO_2$ has been placed in it.

Figure 2:
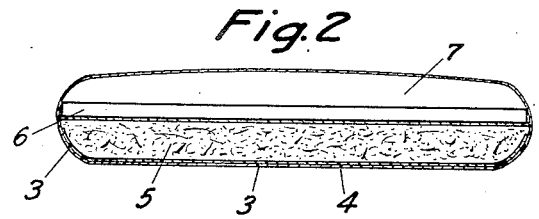
Figure 2 shows a section on the line 2—2 of Figure 1.

Figure 2 shows the constituent parts of the pouch. The pouch comprises a flexible paper cover 3 made out of kraft paper or other suitable material which must be of a porous nature in order to allow the cold gases from the $CO_2$ to pass through it without excessive retardation.

The pouch is lined on one face with a liner comprising a moisture proof kraft paper 4 which has next to the lower outer cover as shown in Figure 2, a fibre batt 5, such as described in our copending applications Serial Numbers 552,943 and 552,944, and a fluted paper board 6 which has the flutings running preferably cross wise across the cover.

Figure 3:
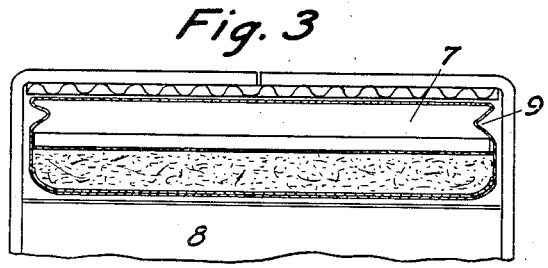
Figure 3 shows a modification of the pouch shown in Figures 1 and 2 as applied to a box.

The surface 4 is glued or otherwise held to the cover 3 so that only the top part of the back as indicated by the space 7 in Figure 2 is available for the dry $CO_2$. This space is slab-shaped as will be seen by considering Figures 1 and 2 together. The solid $CO_2$ is placed in the space 7. As indicated in Figure 3 is the carton or box, this space is open and separated by the insulating material from the food stuff itself. By this means the food stuff, such as ice cream, sherbets or the like, is cooled indirectly by a convection which is established about the sides of the box by the hotter gases rising to the top and being cooled by the vaporized $CO_2$ as it comes through the top cover from the space 7. This means that the ice cream or the like is cooled indirectly by the $CO_2$ gases which normally are not at as low a temperature as the dry ice itself.

The fact that the cover above the space 7 is porous but not open offers sufficient retardation to the cold gases emitted from the solid $CO_2$ so that the temperature of the carton itself may be maintained at an even low temperature which is much higher than the temperature of the dry ice.

In Figure 3 the pouch illustrated as applied to the carton 8 which may be insulated on all sides, has a bellows section as indicated at 9 so that dry ice of various thicknesses may be applied in the pouch if desired.

Figure 4:
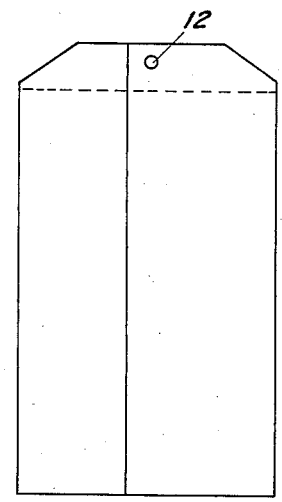
Figure 4 shows a face view of a modification of the invention as applied to milk bottles.
Figure 5:
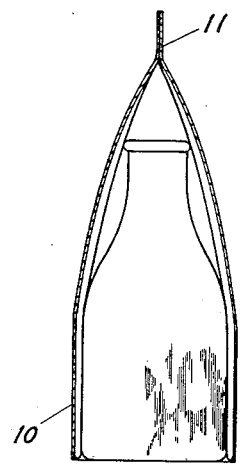
Figure 5 shows how the modification of Figure 4 is applied to a milk bottle.
Figure 6:
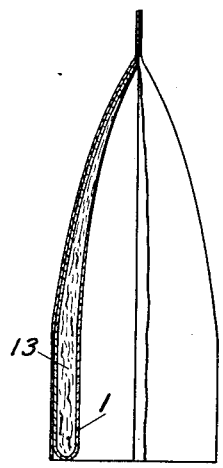
Figure 6 is a section illustrating the details of the cover.

In Figures 4, 5, and 6, a cover is shown as applied to a milk bottle. This cover comprises an outside waterproof asphaltum kraft paper 10 which is formed in the shape of a hood having a peaked or wedged top 11. By employing this form, it is possible to shed the water down and off the cover and thus not give it a chance to soften the paper.

As indicated in Figure 4, the cover is rectangular in shape, but for the top corners which are trimmed off. This top part of the cover where the corners are trimmed off has its two side faces adhered together and a hole 12 may be put through the top so that the cover when not in use can be hung up. As indicated in Figure 5 the inside of the cover is lined with an asphaltum kraft paper liner having on the inside a fibre insulating batt 13. The interior liner is lined practically to the top portions where the front and back sides are glued together. The liner itself does not extend to the bottom of the cover as indicated in Figure 5. As shown in Figure 6 the cover may have a bellows extension but we prefer for the most part to use a stiff edge which allows the cover to fit snugly over the bottle.

It will be obvious that various shapes and sizes may be employed, but we prefer to employ the shape shown in Figures 4 and 5, since the natural shape of the cover being flat there is considerable tension exerted upon the bottle when in place so that it is practically impossible for the wind to blow it off or for it to be unintentionally knocked off. This of course is brought about on account of the fact that the outer surface is made of a stiff kraft paper and no pleat or extra material is provided in the sides.

Without describing further details of our invention which obviously may take other forms, we now claim:

1. An article of the kind described comprising a pouch having an outer porous paper cover, a liner having a moisture proof kraft paper adhered to the inner face of the cover on one side only thereof, a fibre layer superimposed thereon, a fluted board having transverse flutings on the top of said fibre layers, whereby a narrow space adjacent to the top side of the pouch is left vacant for a refrigerant, and means to close the open end of the pouch.

2. An article of the kind described, comprising a pouch having an outer porous paper cover, an insulating liner positioned only at one side of the pouch and having a stiff fluted board on the inner side of said liner, forming a thin flat space for a refrigerant.

3. An article of the kind described comprising a pouch having an outer porous paper cover, an insulating liner positioned only at one side of the pouch and having on the inner side of said liner a stiff fluted board having the flutings running crosswise of the pouch.

4. An article of the kind described comprising a pouch having an outer porous paper cover, an insulating liner positioned at one side of the pouch and having on the inner side thereof a stiff fluted board having the flutings running crosswise of the pouch, and a flexible strip extending from both sides at the open end of the pouch whereby the pouch may be sealed.

5. An article of the kind described, comprising a pouch having an outer porous paper cover, an insulating liner composed of a stiff fluted board, a fibre layer positioned beneath the same and an outer moisture proof kraft paper, said liner being held in said pouch by adhering said moisture proof kraft paper to the inside of the cover, whereby a flat space is left adjacent to the porous side of the pouch to hold the refrigerant.

RALPH L. BANGS.
WM. A. HERMANSON.